United States Patent
Huang et al.

(10) Patent No.: US 9,098,746 B2
(45) Date of Patent: Aug. 4, 2015

(54) BUILDING TEXTURE EXTRACTING APPARATUS AND METHOD THEREOF

(75) Inventors: Fay Huang, Taipei (TW); Yi-Ju Wu, Yilan County (TW); Jiun-Wei Chang, Yilan County (TW); Augustine Tsai, Taipei (TW); Jui-Yang Tsai, Tainan (TW); Wen-Kai Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 559 days.

(21) Appl. No.: 13/164,485

(22) Filed: Jun. 20, 2011

(65) Prior Publication Data

US 2012/0275709 A1  Nov. 1, 2012

(30) Foreign Application Priority Data

Apr. 28, 2011  (TW) .............................. 100114757 A (51) Int. Cl.
*G06K 9/48* (2006.01)
*G06K 9/00* (2006.01)

(52) U.S. Cl.
CPC .................................. *G06K 9/00637* (2013.01)

(58) Field of Classification Search
CPC ........... G02B 2027/0198; G02B 13/06; G09G 3/003; H04N 5/23238; G01C 21/367; G01C 21/3647; G01C 15/00; G01C 21/28; G01C 11/02; G01C 11/06; G06T 17/05; G06T 19/003; G06T 11/00; G06T 3/4038; G06T 15/20; G06T 3/00; G06T 2207/10032; G06T 2207/30184; G06T 17/00; G06T 15/04; G06K 2009/2045; G06K 9/00; G06K 9/04
USPC .......... 382/199, 154, 286, 293; 345/419, 420; 348/144; 703/1
See application file for complete search history.

(56) References Cited

U.S. PATENT DOCUMENTS

| | | | | |
|---|---|---|---|---|
| 6,064,399 | A * | 5/2000 | Teo .............................. | 345/629 |
| 2005/0270537 | A1* | 12/2005 | Mian et al. .................... | 356/437 |
| 2008/0221843 | A1* | 9/2008 | Shenkar et al. ................. | 703/1 |
| 2010/0091020 | A1* | 4/2010 | Kmiecik et al. ............. | 345/427 |
| 2011/0064312 | A1* | 3/2011 | Janky et al. ................... | 382/195 |

* cited by examiner

*Primary Examiner* — Kim Vu
*Assistant Examiner* — Michael Vanchy, Jr.
(74) *Attorney, Agent, or Firm* — Skaar Ulbrich Macari, P.A.

(57) ABSTRACT

A building texture extracting apparatus and a method thereof are provided, wherein the building texture extracting apparatus comprises a storage unit and a processor. The storage unit is configured to store an aerial image and a panoramic image of a building. There is a coordinate correlation between the aerial image and the panoramic image. The processor defines an edge segment of a building in the aerial image, calculates an edge function according to the edge segment, projects the edge function onto the panoramic image according to the coordinate correlation to derive an edge curve function, decides an edge curve segment according to the edge curve function, captures an image area under the edge curve segment to be a building texture of the building, and stores the building texture in the storage unit.

10 Claims, 5 Drawing Sheets

BUILDING TEXTURE EXTRACTING APPARATUS AND METHOD THEREOF

This application claims priority to Taiwan Patent Application No. 100114757 filed on Apr. 28, 2011, which is hereby incorporated by reference in its entirety.

FIELD

The present invention relates to a building texture extracting apparatus and a building texture extracting method thereof. More particularly, the present invention relates to a building texture extracting apparatus for extracting a building texture by means of an aerial image and a panoramic image, and a building texture extracting method thereof.

BACKGROUND

In recent years, the rapid development of computer vision and computer graphics technologies has resulted in the revolutionary development of spatial information industries worldwide, and the traditional two-dimensional (2D) plane spatial information are now gradually replaced by the three-dimensional (3D) visualization applications and 3D space analysis. Accordingly, a trend of presenting a particular spatial object by use of 3D geological information plus visualization of a real 3D scene has arisen in the geological information system, and especially, establishment of 3D building models has now become one of the hottest research topics.

In the process of establishing a 3D building model, one of the most difficult problems is how to process image data of the real 3D scene effectively. Generally speaking, in order to establish a complete, real and large-scale 3D building model, the image data of the real 3D scene must be analyzed at first, then a building texture necessary for establishing the 3D building model is identified and extracted, and finally the extracted building texture is mapped onto the 3D building model through a mapping process to accomplish visualization of the real 3D scene.

Aerial images and panoramic images are two primary kinds of image data necessary for establishing a 3D building model. However, conventional technologies cannot analyze the aerial images and panoramic images efficiently so as to identify and extract building textures necessary for establishing a 3D building model. For example, in most of the conventional technologies, a plurality of aerial images are taken at different orientations and a plurality of panoramic images are taken at different orientations, and then building textures of the images are projected manually onto a 3D building model. However, this way of processing makes the mapping process very complicated, time-consuming and costly; furthermore, because the building texture of each building is formed from a plurality of images taken at different orientations, it is difficult to determine which images shall be kept or discarded, thus causing the building in the 3D building model to have non-uniform tones. Therefore, the conventional technologies not only fail to process the aerial images and panoramic images efficiently, but also make the mapping process very complicated and necessitate beautification and correction of the model subsequent to the mapping process.

In view of this, an urgent need exists in the art to provide a solution that can correctly identify and extract a suitable building texture of a building by effectively analyzing an aerial image and a panoramic image of the building so as to solve the problem of the conventional technologies.

SUMMARY

An objective of the present invention is to provide a building texture extracting apparatus and a building texture extracting method thereof. The building texture extracting apparatus and the building texture extracting method thereof can effectively solve the problems with the prior art that manual extraction of the building texture makes the mapping process complicated, time-consuming and costly and the problem that the building cannot be effectively analyzed and identified to cause non-uniform tones of the building.

To achieve the aforesaid objective, the present invention provides a building texture extracting apparatus, which comprises a storage unit and a processor electrically connected to the storage unit. The storage unit is configured to store an aerial image and a panoramic image of a building, and there is a coordinate correlation between the aerial image and the panoramic image. The processor is configured to perform the following operations: defining an edge line segment of the building in the aerial image; calculating an edge line function according to the edge line segment; calculating an edge curve function by projecting the edge line function onto the panoramic image according to the coordinate correlation; defining an edge curve segment of the building in the panoramic image according to the edge curve function; capturing a sub-image of the panoramic image to be a building texture of the building, wherein the sub-image is under the edge curve segment; and storing the building texture in the storage unit.

To achieve the aforesaid objective, the present invention further provides a building texture extracting method for use in an electronic apparatus. The electronic apparatus comprises a storage unit and a processor electrically connected to the storage unit. The storage unit is configured to store an aerial image and a panoramic image of a building, and there is a coordinate correlation between the aerial image and the panoramic image. The building texture extracting method comprises the following steps of: (a) enabling the processor to define an edge line segment of the building in the aerial image; (b) enabling the processor to calculate an edge line function according to the edge line segment; (c) enabling the processor to calculate an edge curve function by projecting the edge line function onto the panoramic image according to the coordinate correlation; (d) enabling the processor to define an edge curve segment of the building in the panoramic image according to the edge curve function; (e) enabling the processor to capture a sub-image of the panoramic image to be a building texture of the building, wherein the sub-image is under the edge curve segment; and (f) enabling the processor to store the building texture in the storage unit.

According to the above descriptions, the building texture extracting apparatus and the method thereof of the present invention identify and extract a suitable building texture of a building by analyzing an aerial image and a panoramic image of the building. Through the building texture extracting apparatus and the method thereof of the present invention, building textures of a building can be extracted automatically, and all the building textures are extracted from the same panoramic image. Therefore, the present invention can effectively solve the problems with the prior art that manual extraction of the building texture makes the mapping process complicated, time-consuming and costly and the problem that the building cannot be effectively analyzed and identified to cause non-uniform tones of the building.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It shall be appreciated that, in the following embodiments and the attached drawings, elements not directly related to the present invention are omitted from depiction; and dimensional relationships among individual elements in the attached drawings are illustrated only for ease of understanding but not to limit the actual scale.

Figure 1:
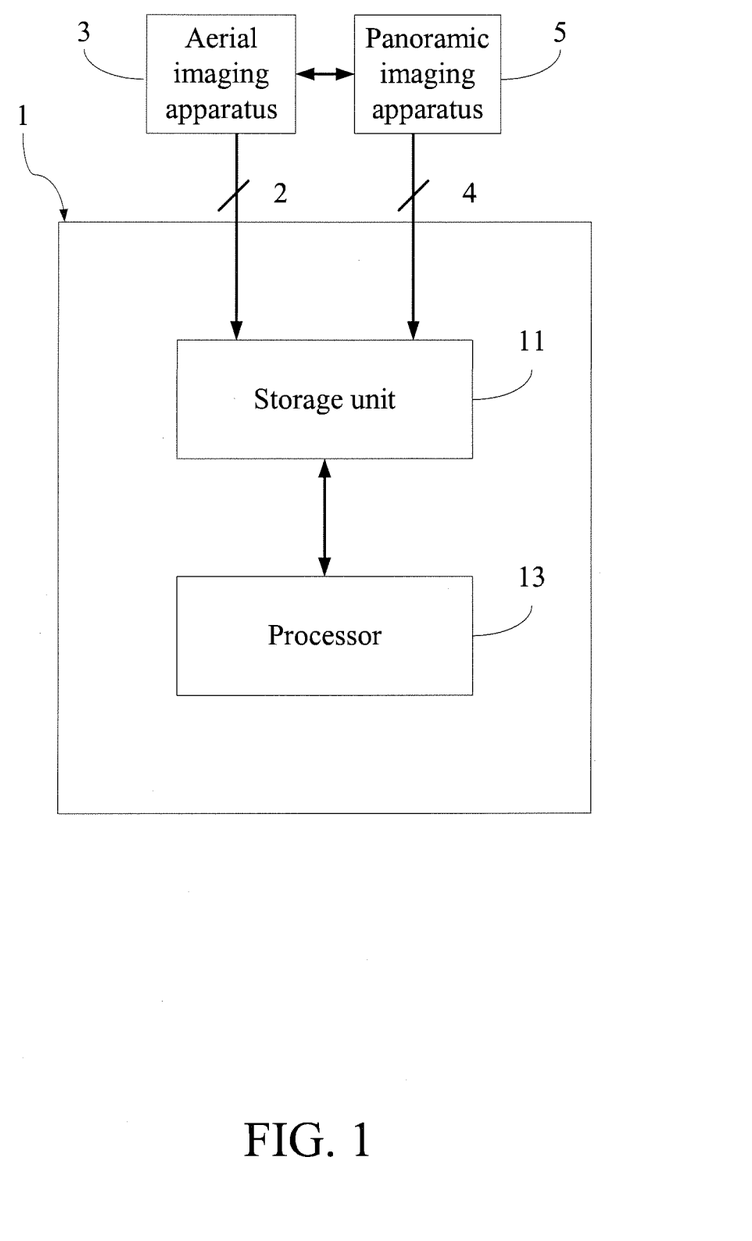
FIG. 1 is a schematic view depicting the internal structure and operations of a building texture extracting apparatus 1 according to a first embodiment of the present invention.
Figure 2A:
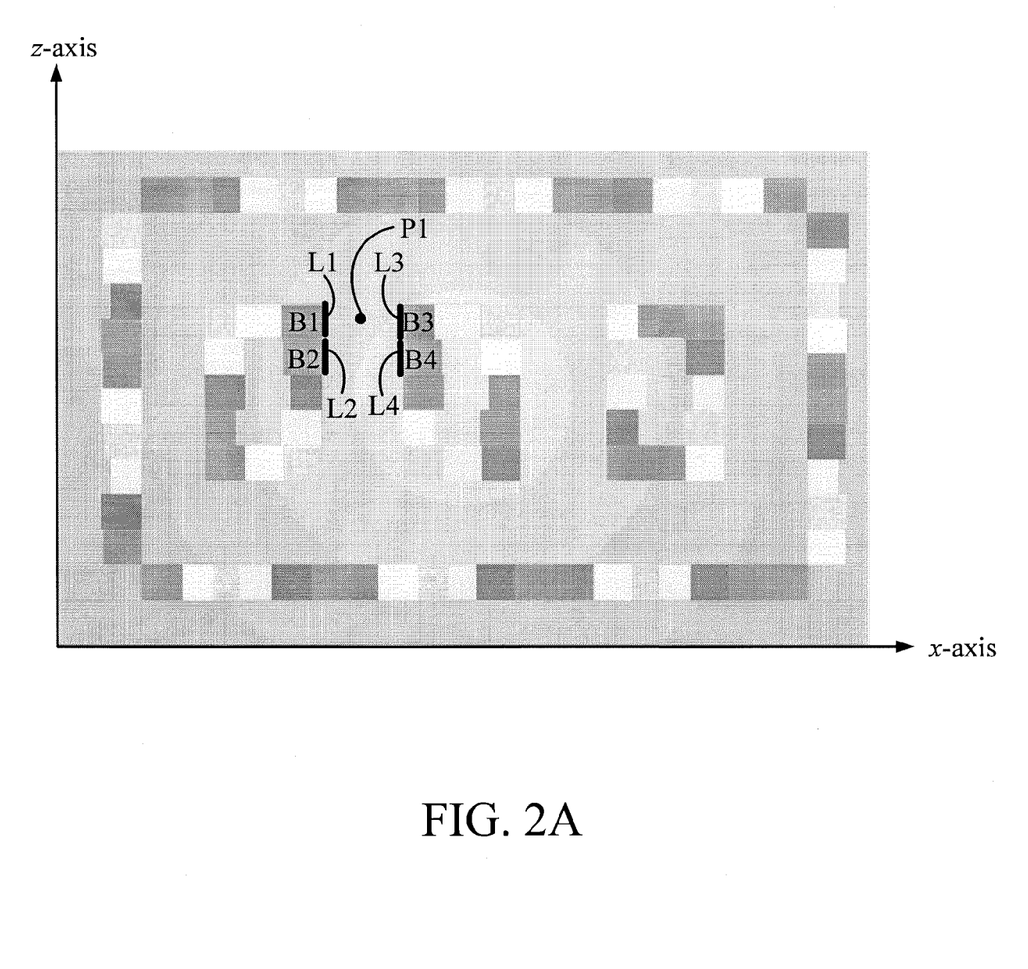
FIG. 2A is a schematic simulated view depicting an aerial image of an area.
Figure 2B:
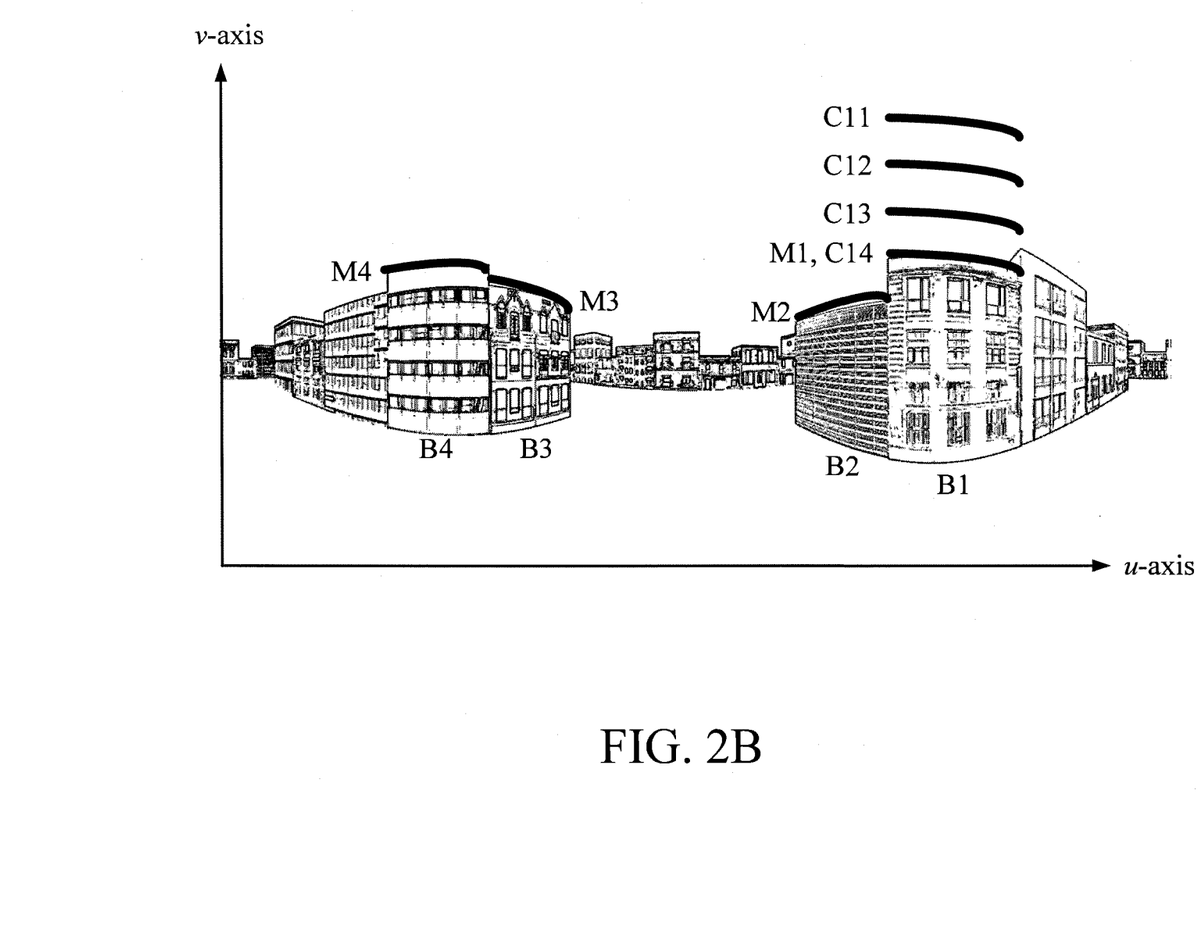
FIG. 2B depicts an edge image obtained by applying edge detection to a panoramic image correlated with the area.

A first embodiment of the present invention is a building texture extracting apparatus 1, which is configured to extract a building texture of at least one building. This embodiment will be described with reference to FIG. 1, FIG. 2A and FIG. 2B together. FIG. 1 is a schematic view depicting the internal structure and operations of the building texture extracting apparatus 1 of the present invention. FIG. 2A is a schematic simulated view depicting an aerial image 2 of an area, in which each small square represents a building. FIG. 2B depicts an edge image 4 obtained by applying edge detection to a panoramic image correlated with the area.

Each of the aerial image 2, the panoramic image, and the edge image 4 comprises an image of the at least one building whose building texture is to be extracted. In this embodiment, the buildings B1, B2, B3 and B4 in the aerial image 2 are to be processed, so a panoramic imaging apparatus 5 can be placed in the space at a position corresponding to the position P1 of FIG. 2A to acquire the panoramic image correlated with this area. In this way, the aerial image 2, the panoramic image, and the edge image 4 all comprise images of the buildings B1, B2, B3 and B4 to be processed.

As shown in FIG. 1, the building texture extracting apparatus 1 of the present invention comprises a storage unit 11 and a processor 13 electrically connected to the storage unit 11. The processor 13 may be any of various processors, central processing units, microprocessors or other calculating apparatuses that are well known to those of ordinary skill in the art. The storage unit 11 may be a memory, a floppy disk, a hard disk, a compact disk (CD), a mobile disk, a magnetic tape, a database accessible to networks, or any other storage media with the same function and well known to those of ordinary skill in the art.

The storage unit 11 has the aerial image 2 and the panoramic image stored therein. There is a coordinate correlation between the aerial image 2 and the panoramic image, which can be obtained in various ways, for example, through a Global Positioning System (GPS). For example, the aerial image 2 can be provided by an aerial imaging apparatus 3 (e.g., a satellite or an aerostat), so the aerial image 2 has a first GPS coordinate. In this case, a GPS coordinate of each pixel of the aerial image 2 can be derived by performing a calculation on the first GPS coordinate. On the other hand, the panoramic image can be provided by a panoramic imaging apparatus 5 (e.g., a panoramic image shooting apparatus), and by disposing the panoramic image apparatus 5 on an apparatus (e.g., a locomotive, an automobile and the like) having a GPS navigating function, the panoramic image can have a second GPS coordinate. In this way, a GPS coordinate of each pixel of the panoramic image can be derived by performing a calculation on the second GPS coordinate. As the aerial image 2 has the first GPS coordinate and the panoramic image has the second GPS coordinate, the coordinate correlation between the aerial image 2 and the panoramic image can be defined by the first GPS coordinate and the second GPS coordinate.

Hereinafter, how the building texture extracting apparatus 1 analyzes the aerial image 2 and the panoramic image to identify and extract the necessary building texture will be described with reference to FIG. 2A and FIG. 2B.

As shown in FIG. 2A, for the buildings B1, B2, B3 and B4 in the aerial image 2 that are to be processed, the processor 13 defines an edge line segment (i.e., edge line segments L1, L2, L3 and L4) respectively. Each of the edge line segments L1, L2, L3 and L4 represents a side, which faces towards a street, of the corresponding building. An approach to define the edge line segments is as follows: firstly, a user marks the edge line segments L1, L2, L3 and L4 in the aerial image 2, and then after reading the marked aerial image 2, the processor 13 can effectively identify and define the edge line segments L1, L2, L3 and L4. Next, the processor 13 calculates an edge line function for each of the edge line segments L1, L2, L3 and L4.

How to calculate the edge line function will be further described with the edge line segment L1 as an example. Suppose that the edge line segment L1 has three-dimensional coordinates of $(x_1, y, z_1)$ at a starting point thereof, and three-dimensional coordinates of $(x_e, y, z_e)$ at an end point thereof. Then, the processor 13 defines a vector $(\Delta x, 0, \Delta z) = (x_e - x_1, 0, z_e - z_1)$ according to the starting point and the end point, and further calculates an edge line function (i.e., $f(x, y, z) = (x_1 + \Delta x \times t, y, z_1 + \Delta z \times t)$) corresponding to the edge line segment L1 in the space according to the vector, wherein the parameter y represents a height value and the parameter $t \in [0, 1]$; $t \in \Re$. In other words, $f(x, y, z)$ represents coordinates of each pixel in the edge line segment L1 of the aerial image 2.

Next, according to the coordinate correlation between the aerial image 2 and the panoramic image, the processor 13 uses a conventional formula for converting line coordinates into spherical coordinates to calculate an edge curve function $f(\mu, v)$ by projecting the edge line function $f(x, y, z)$ onto the panoramic image, wherein the parameter $\mu$ and the parameter v represent a coordinate of a pixel in a curve segment of the panoramic image respectively.

Then, the processor 13 defines an edge curve segment M1 of the building B1 in the panoramic image according to the edge curve function $f(\mu, v)$. The edge curve segment M1 can be considered to correspond to a curve segment at an uppermost edge of the building B1, so the processor 13 can capture a sub-image in the panoramic image to be a building texture of the building B1, wherein the sub-image is under the edge curve segment M1. Hereinafter, one of the approaches to acquire the edge curve segment M1 will be illustrated.

The processor 13 can perform edge detection on the panoramic image to obtain the edge image 4, which comprises a plurality of edge segments of each of the buildings. On the other hand, according to a plurality of preset height values and the edge curve function $f(\mu, v)$ corresponding to the edge line segment L1, the processor 13 defines a plurality of edge curve segment candidates C11, C12, C13 and C14 of the building B1 that are projected onto the panoramic image and the edge image 4. In detail, when the edge line function $f(x, y, z)$ of the edge line segment L1 is projected onto the panoramic image 4 as the edge curve function $f(\mu, v)$ of the corresponding building, different preset height values y will be projected onto different edge curve segments C11, C12, C13 and C14. For example, the edge curve segment candidates C11, C12, C13 and C14 shown in FIG. 2B are obtained by substituting different preset height values y1, y2, y3 and y4 into the edge line function $f(x, y, z)$ respectively and then projecting the edge line function $f(x, y, z)$ onto the panoramic image 4 according to the edge curve function $f(\mu, v)$.

Next, the processor 13 calculates an approximation between each of the edge curve segment candidates C11, C12, C13 and C14 and the edge image 4, and chooses one of the edge curve segment candidates corresponding to the largest approximation (i.e., the edge curve segment candidate C14 shown in FIG. 2B) as the edge curve segment M1 of the panoramic image and the edge image 4. Thereafter, the processor 13 captures an image area under the edge curve segment M1 in the panoramic image as a building texture that is to be extracted, and stores the building texture in the storage unit 11.

Hereinafter, how the aforesaid approximation is calculated will be described with reference to a preferred embodiment; however, the present invention is not limited to this embodiment. In detail, the aforesaid edge detection may further comprise a binarization process for converting each pixel value of the edge image 4 into a binary value so that each pixel of the edge image 4 only has a value of either 1 or 0. In this embodiment, a pixel value of 0 (black) in the edge image 4 represents an edge of the building, and a pixel value of 1 (white) represents that the pixel is not at an edge of the building. Then, the processor 13 calculates an approximation for each of the edge curve segment candidates C11, C12, C13 and C14.

Taking the edge curve segment candidate C11 as an example, the processor 13 inspects pixel values of all pixels corresponding to the edge curve segment candidate C11 in the edge image 4. When there is a pixel value of 0, it represents that the pixel is at an edge of the building, and the processor 13 increases the approximation by 1; and when there is a pixel of 1, it represents that the pixel is not at an edge of the building, and the processor 13 will not adjust the approximation. After the approximations of the edge curve segment candidates C11, C12, C13 and C14 have been calculated by the processor 13, the edge curve segment candidate corresponding to the largest approximation is taken to represent the edge curve segment M1 (i.e., the curve segment corresponding to the uppermost edge of the building B1 in the panoramic image and the edge image 4). Accordingly, the processor 13 can capture a sub-image in the panoramic image to be the building texture of the building B1, wherein the sub-image is under the edge curve segment M1.

Similarly, in the aforesaid way of processing, the processor 13 can also project the edge line segments L2, L3 and L4 in the aerial image 2 onto the panoramic image and the edge image 4 respectively, acquire the corresponding edge curve segments M2, M3 and M4 respectively, and further capture sub-images under the edge curve segments M2, M3 and M4 to be building textures of the buildings B2, B3 and B4 respectively. In other words, the building texture extracting apparatus 1 of the present invention can identify and extract the building textures of the buildings in the panoramic image by analyzing the aerial image 2 and the panoramic image according to requirements of the user.

A second embodiment of the present invention is a building texture extracting method for use in an electronic apparatus. The electronic apparatus comprises a storage unit and a processor electrically connected to the storage unit. The storage unit is configured to store an aerial image and a panoramic image of a building, and there is a coordinate correlation between the aerial image and the panoramic image. The second embodiment will be described with reference to FIG. 3A and FIG. 3B together, wherein FIG. 3A is a flowchart of the second embodiment and FIG. 3B is a detailed flowchart of step S24.

It shall be appreciated that, the electronic apparatus described in this embodiment may be the building texture extracting apparatus 1 described in the first embodiment, and can accomplish all the functions and operations of the building texture extracting apparatus 1 of the first embodiment. Furthermore, the building texture extracting method described in the second embodiment may be implemented by a computer program product. When the computer program product is loaded into the electronic apparatus, a plurality of instructions comprised in the computer program product will be executed to accomplish the building texture extracting method described in the second embodiment. The computer program product may be stored in a tangible machine-readable medium, such as a read only memory (ROM), a flash memory, a floppy disk, a hard disk, a CD, a mobile disk, a magnetic tape, a database accessible to networks, or any other storage media with the same function and well known to those skilled in the art.

Figure 3A:
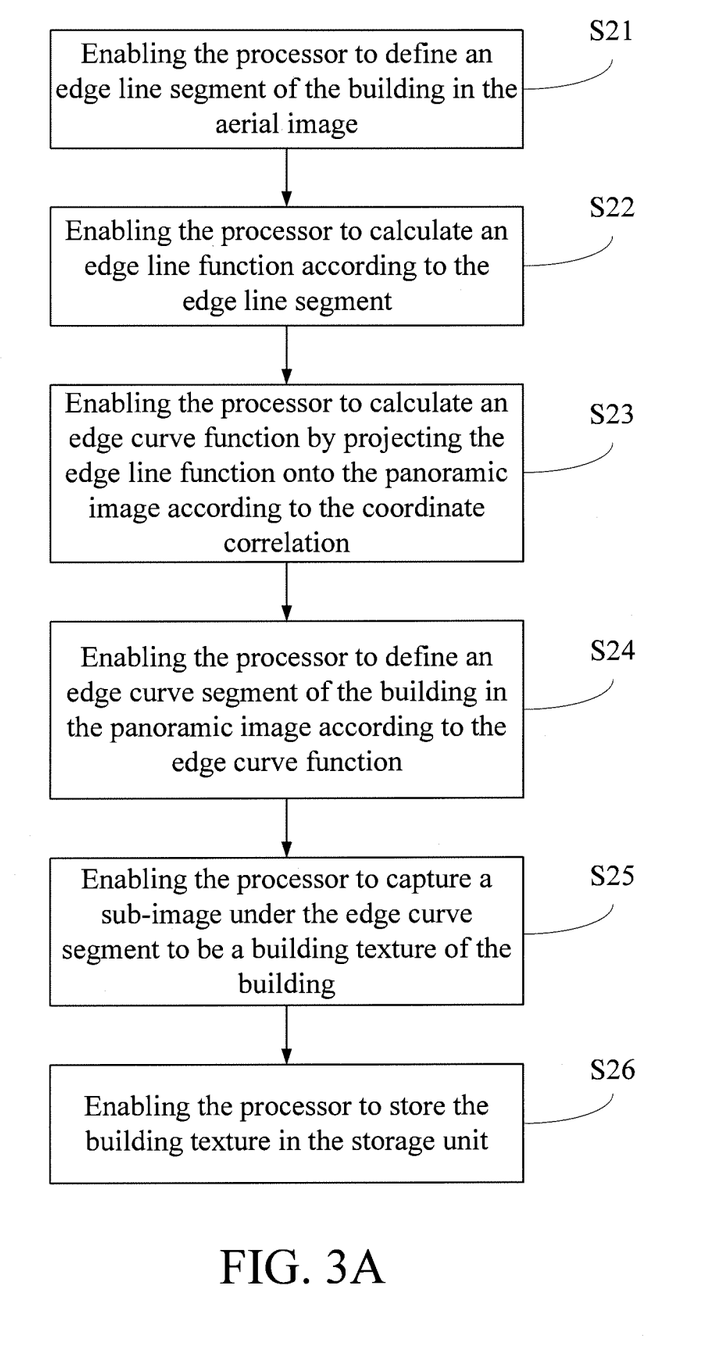
FIG. 3A is a flowchart of a second embodiment.

In detail, referring to FIG. 3A, there is shown a flowchart of the building texture extracting method of the present invention. Step S21 is executed to enable the processor to define an edge line segment of the building in the aerial image. Step S22 is executed to enable the processor to calculate an edge line function according to the edge line segment. Then, step S23 is executed to enable the processor to calculate an edge curve function by projecting the edge line function onto the panoramic image according to the coordinate correlation. Next, step S24 is executed to enable the processor to define an edge curve segment of the building in the panoramic image according to the edge curve function. Step S25 is executed to enable the processor to capture a sub-image under the edge curve segment to be a building texture of the building. Finally, step S26 is executed to enable the processor to store the building texture in the storage unit.

Figure 3B:
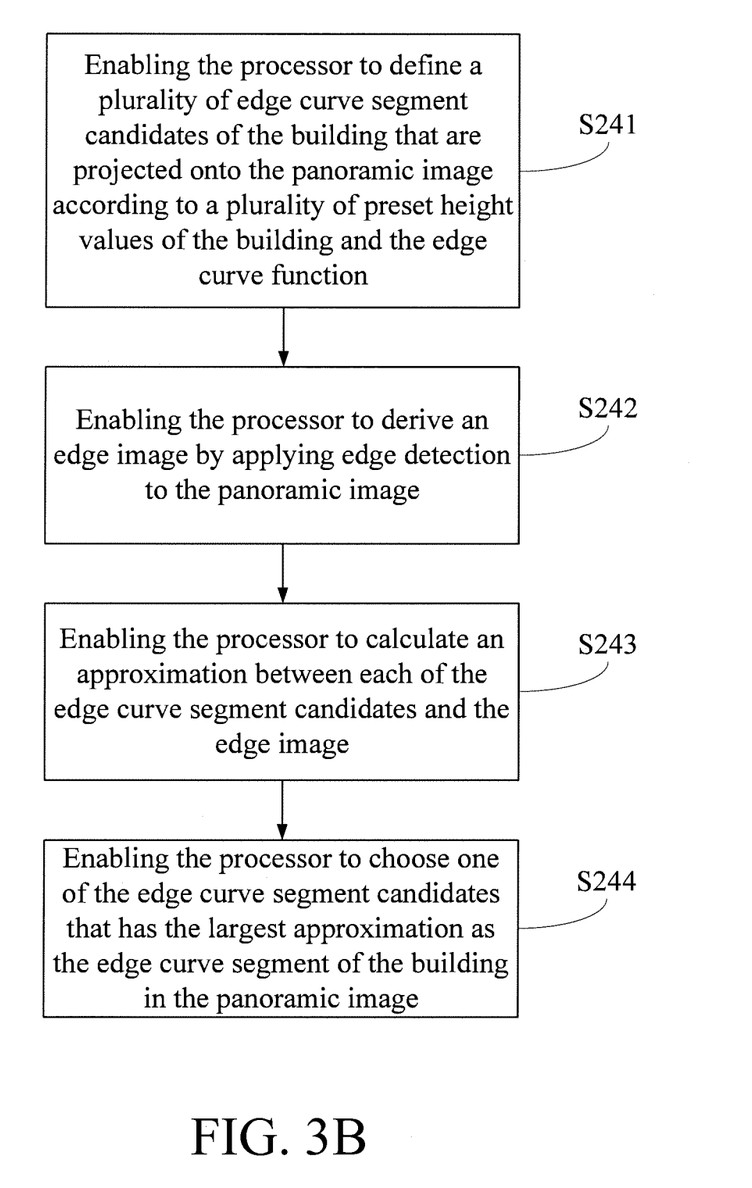
FIG. 3B is a flowchart of a step S24 of the second embodiment.

Further speaking, as shown in FIG. 3B, the step S24 comprises the following sub-steps. Firstly, sub-step S241 is executed to enable the processor to define a plurality of edge curve segment candidates of the building that are projected onto the panoramic image according to a plurality of preset height values of the building and the edge curve function. Then, sub-step S242 is executed to enable the processor to derive an edge image by applying edge detection to the panoramic image. Sub-step S243 is executed to enable the processor to calculate an approximation between each of the edge curve segment candidates and the edge image. Finally, sub-step S244 is executed to enable the processor to choose one of the edge curve segment candidates that has the largest approximation as the edge curve segment of the building in the panoramic image.

It shall be appreciated that, the coordinate correlation between the aerial image and the panoramic image can be defined by the GPS. Specifically, if the aerial image has a first GPS coordinate and the panoramic image has a second GPS coordinate, then the coordinate correlation can be defined by the first GPS coordinate and the second GPS coordinate. Further, the edge detection described in the sub-step S242 may comprise a binarization process so that, after the edge detection, each of a plurality of pixels comprised in the edge segments of the building has a binary value. Furthermore, in addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above descriptions, the building texture extracting apparatus and the method thereof of the present invention identify and extract a suitable building texture of at least one building by analyzing an aerial image and a panoramic image that comprise the at least one building. Through the building texture extracting apparatus and the method thereof of the present invention, building textures of a building can be extracted automatically, and all the building textures are extracted from the same panoramic image. Therefore, the present invention can effectively solve the problems with the prior art that manual extraction of the building texture makes the mapping process complicated, time-consuming and costly and the problem that the building cannot be effectively analyzed and identified to cause non-uniform tones of the building.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A building texture extracting apparatus, comprising:
   a non-transitory storage unit, being configured to store an aerial image and a panoramic image of a building, there being a coordinate correlation between the aerial image and the panoramic image; and
   a processor, being electrically connected to the non-transitory storage unit and configured to perform the following operations:
   defining an edge line segment of the building in the aerial image, the edge line segment having a starting point of three-dimensional coordinates and an end point of three-dimensional coordinates,
   defining a vector according to the starting point and the end point,
   calculating an edge line function corresponding to the edge line segment according to the vector,
   calculating an edge curve function by projecting the edge line function onto the panoramic image according to the coordinate correlation,
   defining an edge curve segment of the building in the panoramic image according to the edge curve function,
   capturing a sub-image of the panoramic image to be a building texture of the building, the sub-image being under the edge curve segment, and
   storing the building texture in the non-transitory storage unit.

2. The building texture extracting apparatus as claimed in claim 1, wherein the processor performs the following operations to define the edge curve segment of the building in the panoramic image:
   defining a plurality of edge curve segment candidates of the building that are projected onto the panoramic image according a plurality of preset height values of the building and the edge curve function;
   deriving an edge image by applying edge detection to the panoramic image;
   calculating an approximation between each of the edge curve segment candidates and the edge image; and
   choosing one of the edge curve segment candidates that has the largest approximation as the edge curve segment of the building in the panoramic image.

3. The building texture extracting apparatus as claimed in claim 2, wherein the edge detection is utilized to obtain a plurality of edge segments of the building in the panoramic image.

4. The building texture extracting apparatus as claimed in claim 3, wherein the edge detection comprises a binarization process so that each of a plurality of pixels comprised in the edge segments of the building is a binary value.

5. The building texture extracting apparatus as claimed in claim 1, wherein the aerial image has a first Global Positioning System (GPS) coordinate, the panoramic image has a second GPS coordinate, and the first GPS coordinate and the second GPS coordinate define the coordinate correlation.

6. A building texture extracting method for use in an electronic apparatus, the electronic apparatus comprising a non-transitory storage unit and a processor electrically connected to the non-transitory storage unit, the non-transitory storage unit being configured to store an aerial image and a panoramic image of a building, there being a coordinate correlation between the aerial image and the panoramic image, the building texture extracting method comprising the following steps of:
   (a) enabling the processor to define an edge line segment of the building in the aerial image, the edge line segment having a starting point of three-dimensional coordinates and an end point of three-dimensional coordinates;
   (a1) enabling the processor to define a vector according to the starting point and the end point;
   (b) enabling the processor to calculate an edge line function corresponding to the edge line segment according to the vector;
   (c) enabling the processor to calculate an edge curve function by projecting the edge line function onto the panoramic image according to the coordinate correlation;
   (d) enabling the processor to define an edge curve segment of the building in the panoramic image according to the edge curve function;
   (e) enabling the processor to capture a sub-image of the panoramic image to be a building texture of the building, the sub-image being under the edge curve segment; and
   (f) enabling the processor to store the building texture in the non-transitory storage unit.

7. The building texture extracting method as claimed in claim 6, wherein the step (d) further comprises the following sub-steps of:
   (d1) enabling the processor to define a plurality of edge curve segment candidates of the building that are projected onto the panoramic image according a plurality of preset height values of the building and the edge curve function;
   (d2) enabling the processor to derive an edge image by applying edge detection to the panoramic image;
   (d3) enabling the processor to calculate an approximation between each of the edge curve segment candidates and the edge image; and
   (d4) enabling the processor to choose one of the edge curve segment candidates that has the largest approximation as the edge curve segment of the building in the panoramic image.

8. The building texture extracting method as claimed in claim 7, wherein the edge detection is utilized to obtain a plurality of edge segments of the building in the panoramic image.

9. The building texture extracting method as claimed in claim 8, wherein the edge detection comprises a binarization process so that each of a plurality of pixels comprised in the edge segments of the building is a binary value.

10. The building texture extracting method as claimed in claim 6, wherein the aerial image has a first GPS coordinate, the panoramic image has a second GPS coordinate, and the first GPS coordinate and the second GPS coordinate define the coordinate correlation.

\* \* \* \* \*